J. F. O'CONNOR.
HAND BRAKE FOR FLAT CARS.
APPLICATION FILED FEB. 16, 1918.
1,300,471.
Patented Apr. 15, 1919.
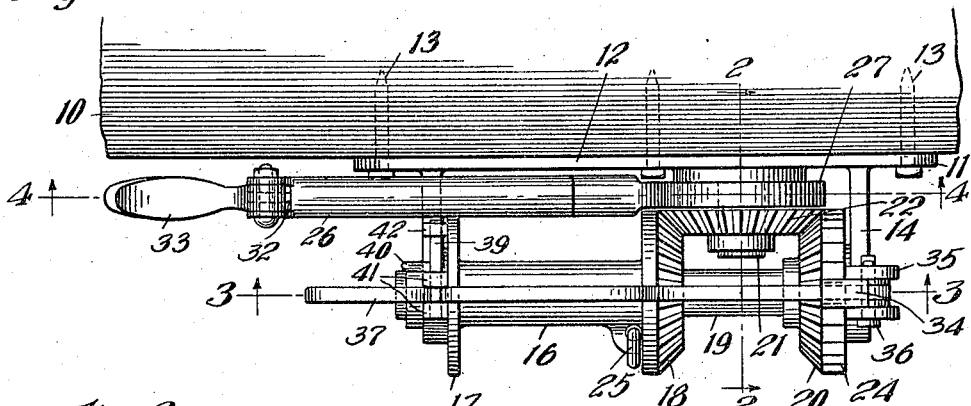
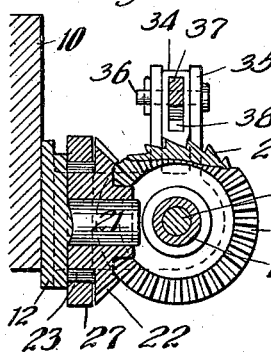
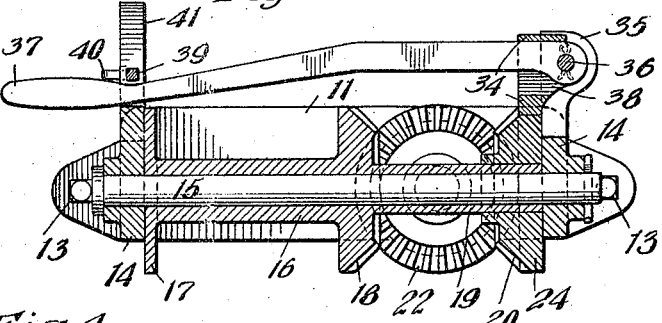
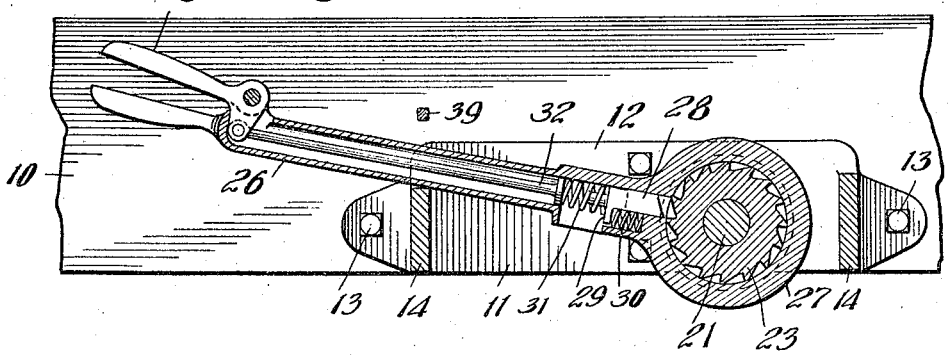
INVENTOR.
John F. O'Connor
BY Geo. I. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

HAND-BRAKE FOR FLAT-CARS.

1,300,471. Specification of Letters Patent. Patented Apr. 15, 1919.

Application filed February 16, 1918. Serial No. 217,511.

*To all whom it may concern:*

Be it known that I, JOHN F. O'CONNOR, a citizen of the United States, residing at Chicago, in the county of Cook and State of Illinois, have invented a certain new and useful Improvement in Hand-Brakes for Flat-Cars, of which the following is a full, clear, concise, and exact description, reference being had to the accompanying drawings, forming a part of this specification.

This invention relates to improvements in hand brake for flat cars.

The object of this invention is to provide a simple and compact hand brake suitable for use on flat cars and which will occupy a minimum of space and have all the parts thereof so disposed as to avoid interference with any loading which may be on the car.

In the drawing forming a part of this specification, Figure 1 is a top plan view of a portion of the end of a flat car showing my improvements in connection therewith. Fig. 2 is a vertical, sectional view, taken substantially on the line 2—2 of Fig. 1. Fig. 3 is a transverse, vertical, sectional view, taken substantially on the line 3—3 of Fig. 1. And Fig. 4 is a sectional view parallel to that of Fig. 3, but taken substantially on the line 4—4 of Fig. 1.

In said drawing, 10 denotes the end sill of a flat car and to which my improved hand brake is preferably applied.

The improved brake, as shown, includes a supporting casting 11 having a main back plate 12 secured to the end sill by any suitable means, such as the bolts 13, and from said plate 12 extend outwardly a pair of bracket arms 14—14 at each end thereof. Carried in said arms 14 near the outer ends of the latter is a heavy pin 15 adapted to act as an axle for a chain-winding drum or spool 16, as clearly indicated in Fig. 3. Said drum 16 is provided at one end with a flange 17 and near the center thereof with a bevel gear 18. To the opposite side of the gear 18 is formed a hollow sleeve 19 on which is rotatably supported a second bevel gear 20. Interposed between the bevel gears 18 and 20 and rotatably mounted on a stud shaft 21 is a third bevel gear 22, the latter being also provided with a ratchet wheel 23 preferably formed integral therewith. The gear 20 is also provided with a peripheral ratchet wheel 24 for the purpose hereinafter described. As will be understood, the brake-chain is adapted to be attached to the drum 16, as indicated at 25 in Fig. 1, and as the drum 16 is rotated, the chain will be wound therearound to apply the brakes.

In order to effect rotation of said drum 16 in a direction to tighten the brake-chain, I employ a hand lever 26 having an annular inner end 27 which fits over the ratchet wheel 23, the latter forming a suitable bearing therefor. The handle 26 is hollow and near the annular end 27 there is mounted therein a slidable pawl 28 adapted to coöperate with the ratchet wheel 23. Said pawl 28 has a finger 29 with which engages a spring 30 and at its end, said pawl 28 is engaged by another spring 31 that in turn is adapted to be compressed by a plunger 32 operable from a bell-crank grip-handle 33. In normal position of the parts, the pawl 28 occupies the position shown in Fig. 4, that is, the spring 30 is of sufficient strength to disengage the pawl from the ratchet wheel 23. In operating the device, however, the user will naturally grip the bell-crank handle 33 and thereby force the plunger 32 inwardly, which in turn will compress the spring 31 to such an extent as to overcome the spring 30 and thereby have the pawl 28 engage the ratchet wheel 23. The pawl is so arranged that the ratchet wheel 23 will be actuated as the operating handle 26 is pulled downwardly, whereby the brakeman obtains the best leverage action. As the operating handle 26 swings upwardly or clockwise, as viewed in Fig. 4, even though the hand-grip 33 is depressed, the pawl 28 can slide over the ratchet wheel 23. With this arrangement, it is evident that the bevel gear 22 can be rotated step-by-step in a counterclockwise direction, as viewed in Fig. 3, which will cause a corresponding rotation of the drum 16 to wind the chain.

In order to prevent unwinding of the chain, I employ a pawl 34 pivotally mounted between a pair of upstanding ears 35, said pawl 34 being carried on a pin 36. As will be apparent, the pawl 34 engages the teeth of the ratchet wheel 24 and prevents the latter from rotating in a counterclockwise direction, as viewed in Fig. 2, so that, the bevel gear 20 being held against rotation, the drum 16 will be similarly held through the intermediary of the bevel gear 22.

To effect release, I employ a release lever 37 also mounted on said pin 36 and extending through an enlarged recess 38 in the pawl 34. The lever 37 is so arranged with respect to the pawl 34 that by swinging the lever 37 upwardly, as viewed in Fig. 3, the pawl 34 will be disengaged from the ratchet wheel 24, while at the same time the pawl 34 is permitted an independent up and down movement when the release lever 37 is in its down or normal position.

In order to avoid possible injury to the brakeman during release of the brake-chain, I preferably employ a slidable latch 39 having a finger-piece 40, said latch 39 being slidable horizontally in suitable recesses provided therefor in upstanding arms 41 and 42. Said latch 39 is so designed that one end is adapted to engage over the operating handle 26 and the other end over the release lever 27 and the length of the latch is made so that it must be over either the handle 26 or the lever 37 in order to operate either one thereof. With this arrangement, it is evident that the release lever 37 cannot be lifted up unless the latch 39 is extended over the handle 26 so that, should by any accident the pawl 28 be in engagement with the ratchet wheel 23, sudden release of the chain by disengaging the pawl 34 will not cause the operating handle 26 to be thrown upwardly and thereby possibly strike the brakeman.

From the preceding description, it will be seen that the improved brake is so designed that it can be employed on the end of a freight car and will not occupy a vertical space greater or substantially greater than the vertical height of the end sill and that all the parts will therefore be normally below the level of the floor of the flat car. At the same time, the operating handle 26 is so located that it affords a good grip for the brakeman when he is standing on the step at the end of the car and permits him to exert his strength in winding the chain by pulling on the handle and without the necessity of using either foot to control a foot-operated locking dog, such as has heretofore been a common practice.

Although I have herein shown and described what I now consider the preferred embodiment of my invention, the same is merely illustrative, and I contemplate all changes and modifications that come within the scope of the claims appended hereto.

I claim:

1. In a brake mechanism for a flat car, the combination with a chain-winding element rotatable about a horizontal axis extending transversely of the car; of a ratchet wheel; a pawl actuating lever oscillatable about a horizontal axis extending longitudinally of the car, said lever being operable from the side of the car; and means interposed between said ratchet wheel and said element for communicating movement of the former to the latter to thereby effect winding of the chain.

2. In a brake mechanism for flat cars, the combination with a chain-winding element; of a ratchet wheel for rotating said element; a pawl operating lever coöperable with said ratchet wheel and having a handle normally extending toward and operable from the side of the car; a locking dog to hold said element against reverse rotation when the chain is wound thereon; and an operating release handle for said dog also extended toward and operable from the side of the car.

3. In a winding mechanism, the combination with a rotatable chain-winding element; of a ratchet wheel; a pawl actuating lever for rotating said ratchet wheel step-by-step; gearing associated with said ratchet wheel for rotating said drum; means for locking said drum against reverse rotation, said means including a locking dog and a release lever for disengaging the dog, said release lever and actuating lever being extended in the same direction and operable from the same position of the operator; and a supporting bracket for all of said parts by which the same are adapted to be mounted on a car or other structure.

4. In a winding mechanism, the combination with a supporting casting; of a chain-winding drum rotatably mounted on said casting and having a beveled gear; of a ratchet wheel rotatable about an axis at right angles to the axis of rotation of the drum, said ratchet wheel having also a beveled gear coöperable with the first named bevel gear; a pawl actuating lever coöperable with the ratchet wheel; a third bevel gear meshing with the ratchet wheel bevel gear; a locking dog coöperable with the third named bevel gear; and a release lever for disengaging said dog, said release lever and the actuating lever being extended in the same direction so that both may be operated by the operator from the same position.

5. In a winding mechanism, the combination with a supporting casting; of a chain-winding drum rotatably mounted on said casting and having a bevel gear; of a ratchet wheel rotatable about an axis at right angles to the axis of rotation of the drum, said ratchet wheel having also a bevel gear coöperable with the first named bevel gear; a pawl actuating lever coöperable with the ratchet wheel; a third bevel gear meshing with the ratchet wheel bevel gear; a locking dog coöperable with the third named bevel gear; and a release lever for disengaging said dog, said release lever and the actuating lever being extended in the same direction so that both may be operated by the operator from the same position; and means for insuring locking of one of said levers while the other is being operated.

6. In a brake mechanism for a flat car having an end sill, the combination with a supporting bracket extending in a generally horizontal direction and secured to said end sill, of a chain winding drum rotatably mounted on said bracket about a horizontal axis extending substantially parallel to the end sill, of a ratchet wheel rotatably mounted on said bracket about a horizontal axis extending perpendicular to the end sill, a pawl operating lever oscillatable in a vertical plane parallel to said end sill, said lever in normal condition extending toward one end of said end sill and arranged to be disposed entirely below the top plane of said end sill, and means interposed between said ratchet wheel and said drum for communicating movement of the ratchet wheel to the drum.

In witness that I claim the foregoing I have hereunto subscribed my name this 7th day of Feb., 1918.

JOHN F. O'CONNOR.

Copies of this patent may be obtained for five cents each, by addressing the "Commissioner of Patents, Washington, D. C."